(12) United States Patent
Kross et al.

(10) Patent No.: US 8,536,532 B1
(45) Date of Patent: Sep. 17, 2013

(54) UPCONVERTING NANOPARTICLES FOR OPTIMIZING SCINTILLATOR BASED DETECTION SYSTEMS

(75) Inventors: Brian Kross, Yorktown, VA (US); John E. (Jack) McKisson, Williamsburg, VA (US); John McKisson, Hampton, VA (US); Andrew Weisenberger, Yorktown, VA (US); Wenze Xi, Odenton, MD (US); Carl Zorn, Yorktown, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 245 days.

(21) Appl. No.: 13/199,827

(22) Filed: Sep. 9, 2011

(51) Int. Cl.
*G01T 1/20* (2006.01)
(52) U.S. Cl.
USPC .................................................. 250/361 R
(58) Field of Classification Search
USPC .................. 250/361 R, 370.11, 458.1, 459.1, 250/483.1
See application file for complete search history.

(56) References Cited

U.S. PATENT DOCUMENTS

| 2006/0065833 A1* | 3/2006 | Craig et al. | 250/338.4 |
| 2012/0064134 A1* | 3/2012 | Bourke et al. | 424/401 |

OTHER PUBLICATIONS

Shan Jiang, et al. Optical Image-Guided Cancer Therapy with Fluorescence Nanoparticles, Journal of the Royal Society Interface, 2010(7) pp. 3-18, Sep. 16, 2009 (on line).
Scott A. Hilberbrand et al., Upconverting Luminescent Nanomaterials: Applications to In Vivo Bioimaging, Chem. Commun. (Camb), (28), Jul. 28, 2009, pp. 4188-4190.
Vinegoni et al. Transillumination Fluorescence Imaging in Mice Using Biocompatible Upconverting Nanoparticles, Opt. Lett. 34(17), Sep. 1, 2009, pp. 2566-2568.

* cited by examiner

*Primary Examiner* — Mark R Gaworecki

(57) ABSTRACT

An upconverting device for a scintillation detection system is provided. The detection system comprises a scintillator material, a sensor, a light transmission path between the scintillator material and the sensor, and a plurality of upconverting nanoparticles particles positioned in the light transmission path.

19 Claims, 3 Drawing Sheets

UPCONVERTING NANOPARTICLES FOR OPTIMIZING SCINTILLATOR BASED DETECTION SYSTEMS

The United States government may have certain rights to this invention under Management and Operating Contract No.DE-AC05-06OR23177 from the Department of Energy.

FIELD OF INVENTION

The invention relates to a scintillation based detection system utilizing upconverting nanoparticles.

BACKGROUND OF INVENTION

Upconverting nanoparticles are phosphors that absorb light at a first wavelength and emit light at a shorter wavelength in an Anti-Stokes emission process. Many upconverting nanoparticles absorb light in the near IR range and emit light in the visible region. Upconverting nanoparticles have been synthesized using host lattices such as $LaF_3, YF_3, Y_2O_3, LaPO_3, NaYF_4$ codoped with trivalent rare earth ions such as $Yb^{+3}, Er^{3+}$, and $Tm^{+3}$. The rare earth lanthanide ions doped in crystal centers of the lattice act as absorber ions and emitter ions.

In the prior art the use of upconverting nanoparticles is typically associated with putting the upconverting nanoparticles in a biological material or system to facilitate detection of a component and/or imaging as the Anti-Stokes emission of upconverting nanoparticles has good photostability under prolonged emission excitation, the emission of the upconverting nanoparticles is a wavelength(s) that is distinguishable from natural fluorescence in biological materials and the upconverting nanoparticles have low toxicity.

Other applications of upconverting nanoparticles include product and/or brand authentication, improved efficiency of LED lamps, and renewable energy applications. In renewable energy applications, optical nano-materials have the ability to better utilize the full spectrum of solar radiation, which results in an enhanced photovoltaic energy efficiency, and more effective use of solar energy, for example.

Scintillator based detection systems are widely used in nuclear and particle physics and in commercial imaging devices such as medical imaging and non-destructive evaluation devices. Scintillator based detection systems have a scintillator material which has the property of luminescence namely the ability to produce light when excited by ionizing radiation. The detection system also has a sensor that receives the light produced by the scintillation material. Photomultiplier tubes are exemplary of commonly used sensors. The sensor may be physically positioned so that the light produced by the scintillator material can strike the sensor or the scintillator material may be coupled to the sensor via a device such as a light guide.

The scintillator based detection devices of the prior art are known to have a shortcoming in that the wavelength of light that maximizes transmission in the scintillator material is not the optimum wavelength of sensitivity for the commonly used sensors. Accordingly, the sensitivity and efficiency of the detection system is less than optimum.

Accordingly, there is a need for a scintillator based detection system with improved matching of scintillator light transmission and sensitivity of the sensor.

SUMMARY OF INVENTION

The present invention provides a scintillation based detection system comprising a scintillator material; a sensor; a light transmission path between the scintillator material and the sensor, the light transmission path comprising a first scintillator surface, light transmission path volume and a first sensor surface; and a plurality of upconverting nanoparticles particles positioned in the light transmission path.

In one exemplary embodiment, the first scintillator surface of the scintillation detection system is adjacent the light transmission path volume and at least a portion of the plurality of upconverting nanoparticles are coated on the first scintillator surface.

In another exemplary embodiment, the first sensor surface of scintillation detection system is adjacent the light transmission path volume and at least a portion of the plurality of upconverting nanoparticles are coated on the first sensor surface.

In another exemplary embodiment the light transmission path volume comprises a light guide and at least a portion of the plurality of the upconverting nanoparticles are included in the light guide in which the light guide could be any light guiding transparent material such as a solid, liquid, gel, grease or gas.

The present invention provides a method of making a scintillation detection system. The method of making a scintillation system comprises providing a scintillator material; providing a sensor; providing a light transmission path between the scintillator and the sensor, the light transmission path comprising a first scintillator surface, a first sensor surface, and a light transmission path volume; providing a plurality of upconverting nanoparticles; and placing the plurality of upconverting nanoparticles in the light transmission path.

DETAILED DESCRIPTION OF INVENTION

The present invention includes a scintillation based detection system that utilizes upconverting nanoparticles to optimize matching the wavelength of light that maximizes transmission in the scintillator material with the wavelength of light of optimum sensitivity of commonly used sensors. In the scintillation based detection system of the present invention upconverting nanoparticles are interposed between scintillator material and the sensor such that light emitted from the scintillator material strikes the upconverting nanoparticles and is converted to a shorter wavelength before passing into the sensor.

As used herein upconverting nanoparticles are nanoparticles that absorb light at a first energy and a first wavelength and emit light at a second energy and a second wavelength wherein the second energy is higher than the first energy and the second wavelength is shorter than the first wavelength. The upconversion is an Anti-Stokes Emission process.

As used herein a "light transmission path" is the path that light travels from a scintillator material to a sensor. The light transmission path may include, but is not limited to, a gaseous medium including gaseous mediums under reduced pressures (i.e. vacuum conditions), ambient pressure, or pressurized gas, aerosols, transparent adhesives, gels, grease, and structures such as light guides and surfaces of the scintillator and sensor, for example. The "light transmission path volume" is that portion of the "light transmission path" between the scintillator surface and the sensor surface.

In one exemplary embodiment the scintillation detection system comprises a scintillator material positioned in a scintillator, a sensor, a light transmission path between the scintillator material and the sensor; and a plurality of upconverting nanoparticles. The plurality of upconverting nanoparticles are positioned in the light transmission path.

The plurality of upconverting nanoparticles can be positioned at any place in the light transmission path so long as they are between the scintillator material and the sensor. The upconverting nanoparticles may be coated on a surface in the light transmission path, dispersed in a structure in the light transmission path, or dispersed in a gas or suspended in an aerosol in the light transmission path, for example.

Figure 1:
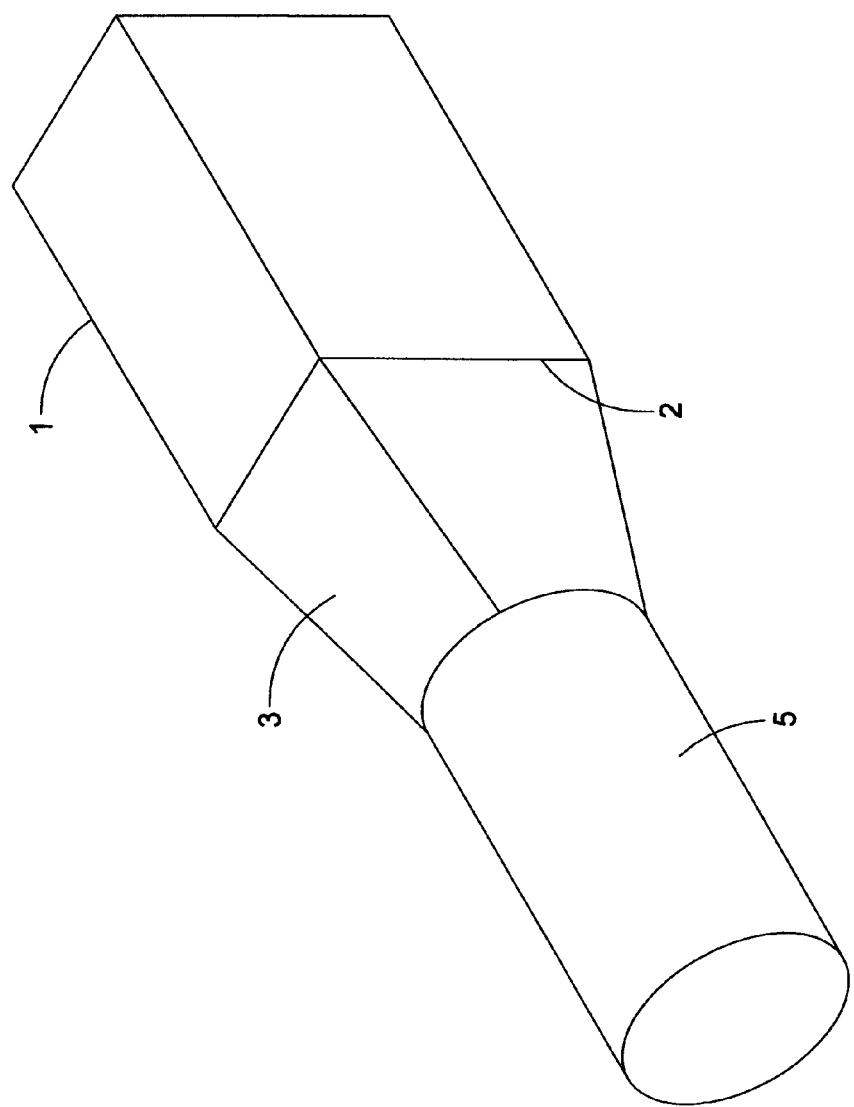
FIG. 1 is a schematic drawing of one embodiment of the scintillator based detection system of the invention in which upconverting nanoparticles are positioned on/in the scintillator surface.
Figure 2:
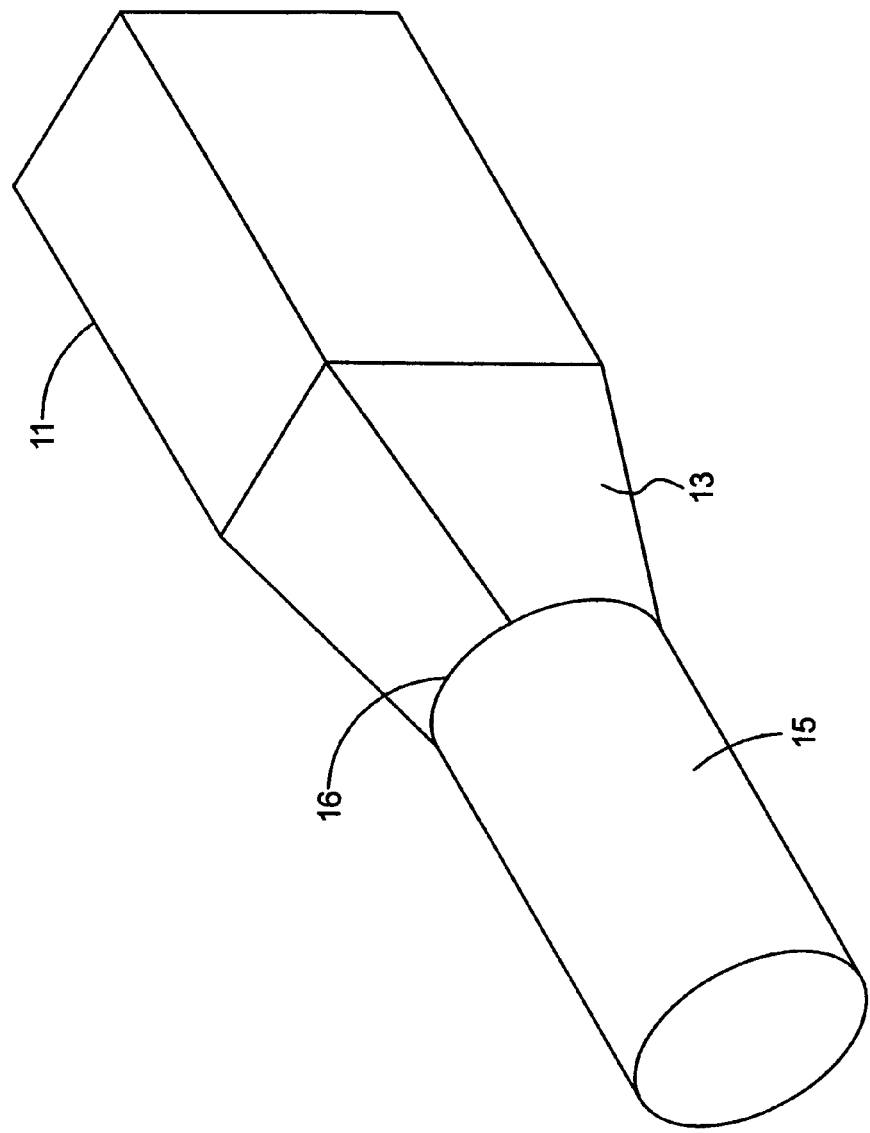
FIG. 2 is a schematic drawing of one embodiment of the scintillator based detection system of the invention in which upconverting nanoparticles are positioned on/in the sensor surface.

As shown in FIG. 1, in one embodiment of the scintillator based detection system of the invention the scintillation material of the scintillator 1 has a first scintillator surface 2 adjacent the light transmission path volume 3. At least a portion of the plurality of upconverting nanoparticles are coated on the first scintillator surface 2, thus positioning the upconverting nanoparticles between the scintillator material of the scintillator 1 and the sensor 5. Alternatively, in another embodiment of the scintillator based detection system of the invention as shown in FIG. 2, the sensor 15 has a first sensor surface 16 adjacent the light transmission path volume 13 and at least a portion of the plurality of upconverting nanoparticles are coated on or dispersed in the first sensor surface 16 thus positioning the upconverting nanoparticles between the scintillator material of the scintillator 11 and the sensor 15.

Figure 3:
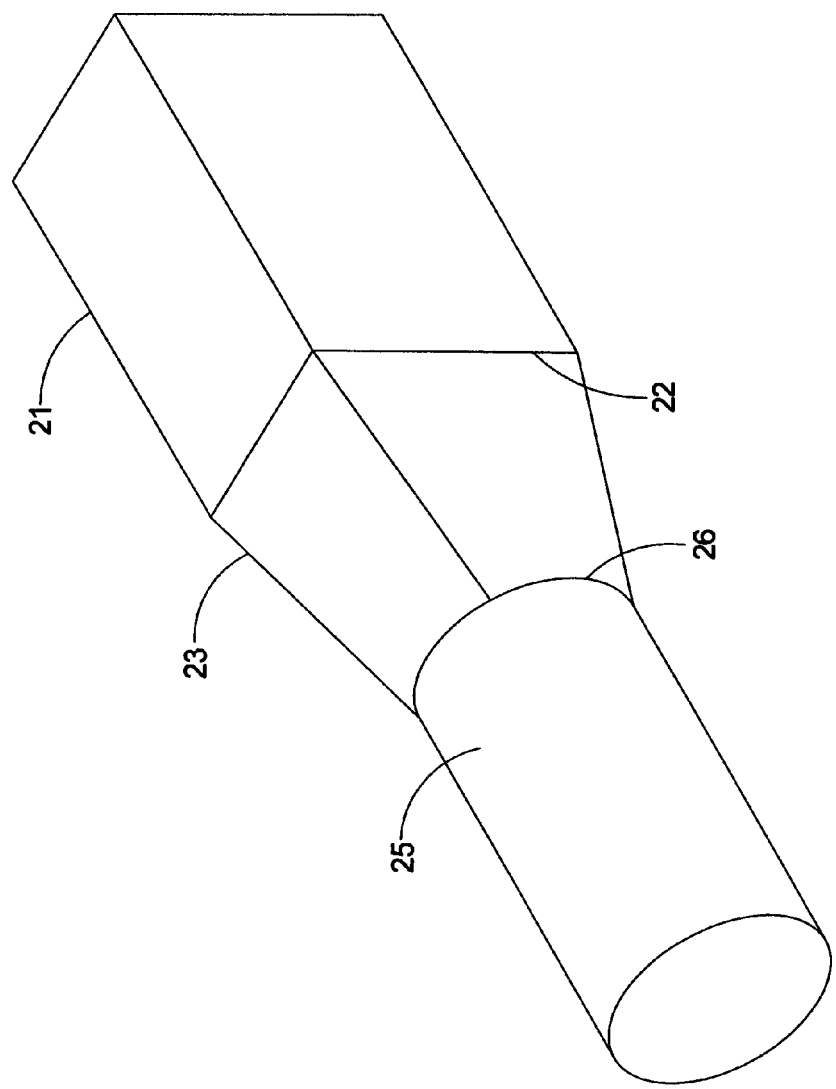
FIG. 3 is a schematic drawing of one embodiment of the scintillator based detection system of the invention in which upconverting nanoparticles are dispersed or suspended in the light transmission path volume.

In another embodiment of the scintillator based detection system of the invention, as shown in FIG. 3, the upconverting nanoparticles are dispersed or suspended in the light transmission path volume 23 between the first sensor surface 26 of the sensor 25 and the first scintillator surface 22 of the scintillation material of the scintillator 21. The light transmission path volume may be a gas or aerosol or alternatively a structure such as a light guide, or an agent such as an optical couplent, such as an optical grease or adhesive. In embodiments in which the light transmission path volume is a light guide, the light guide may include at least a portion of the plurality of the upconverting nanoparticles which may be coated on or dispersed in the light guide.

As one skilled in the art will appreciate, for convenience in fabrication it may be preferable to coat or disperse the upconverting nanoparticles in one of the scintillator first surface, sensor first surface or light transmission path volume but embodiments in which upconverting nanoparticles are included in two or more of these components is also contemplated with the scope of this invention.

The upconverting nanoparticles may comprise host lattices such as $LaF_3$, $YF_3$, $Y_2O_3$, $LaPO_3$, $NaYF_4$ codoped with trivalent rare earth ions including, but not limited to, $Yb^{+3}$, $Er^{+3}$, and $Tm^{+3}$. The rare earth ions are doped in crystal centers of the lattice. The absorbed and emitted wavelength of light of an upconverting nanoparticle is determined by selection of the lattice, the doping material(s) and the concentration used. Accordingly, a nanoparticle's absorbed and emitted wavelengths can be selected by selecting the type(s) and amount(s) of rare-earth element(s) doped into selected nanoscale materials and numerous combinations with various absorption and emission wavelengths can be produced.

Optionally, it may be desirable to use a plurality of types of nanoparticles in a single upconverting device to provide enhanced detection for multiple wavelengths of light. This may be accomplished, for example, by obtaining and mixing two or more different types of upconverting nanoparticles prior to coating, embedding or dispersing the upconverting nanoparticles in the light transmission path.

Alternatively, in some embodiments a plurality of layers of nanoparticles may be coated onto a surface. The nanoparticles may be of the same or different types of nanoparticles.

Exemplary upconverting nanoparticles suitable for use in the practice of the invention include, but are not limited to, yttrium oxide ($Y_2O_3$) doped with rare earth elements. For example, yttrium oxide ($Y_2O_3$) nanoparticles doped with erbium and yttrium absorb light in the near infrared region at about 980 nm and can emit light as higher energy sorter wavelength photons (i.e. light) in an Anti-Stokes emission. Another exemplary upconverting nanoparticle is $NaYF_4$: YbEr which absorbs light at infrared light at 980 nm and emits light at 545 nm and is commercially available from Sun Innovation Technology Inc. (43241 Osgood Rd., Fremont, Calif. 94539) as a colloid. These two specific examples of suitable nanoparticles are provided for exemplary purposes, and as one skilled in the art will appreciate that many other upconverting nanoparticles are also suitable.

The scintillator material may be any material that has the property of luminescence or the ability to produce light when excited by ionizing radiation. Exemplary scintillator materials include, but are not limited to, organic crystals, organic liquids, plastic scintillators, inorganic crystals, gaseous scintillators, glasses and combinations thereof.

Typically, for scintillation detection systems in which the scintillator material is a plastic scintillator, the plastic scintillator comprises a polymer matrix and a fluorescent material. Suitable polymer matrices include but are not limited to polyvinyltoluene, styrene polymers, polymethylmethacrylate, polyvinyl xylene, polyvinyl diphenyl, naphathalene polymers, copolymers, and mixtures thereof. Suitable fluorescent materials include, but are not limited to, polyphenyl, hydrocarbons, oxazle, oxadiazole aryls, and combinations thereof.

In scintillation detection systems in which the scintillation material is an inorganic crystal, exemplary inorganic crystals include, but are not limited to, barium fluoride, calcium fluoride, bismuth germinate, cadmium tungstate, calcium tungstate, cesium iodide, lanthium bromide, lanthium chloride, lead tungstate, lutetium iodide, lutetium oxyorthosllicate, sodium iodide, yttrium aluminum garnet, zinc sulfide, zinc tungstate, cerium fluoride and combinations thereof.

Fluorescent materials identified in *Radiation Detection and Measurement*, Glenn Knoll (John Wiley & Sons, Inc., New York, 2000) and incorporated herein by reference in its entirety may likewise be suitable.

Any electronic sensor capable of detecting light may be used in the scintillation based detection system. Exemplary sensors include, but are not limited to, photomultiplier tubes, silicon photomultiplier, microchannel plate, photo diodes, avalanche photodiodes and combinations thereof. The scintillation based detection system of the invention is particularly useful with conventional sensors in that the upconverting nanoparticles in the light transmission path can convert light of a wavelength emitted by the scintillating material to a shorter wave light that is better suited to optimum performance of the conventional sensor and thus facilitate matching the optimum transmission of the scintillating material with maximizing the sensitivity of the detector.

An advantage of one embodiment of the present invention is that given the very small size of the nanoparticles and the fact that the nanoparticles are positioned in the light transmission path, the scintillation detection system of the present invention can be incorporated in equipment which is in size and gross configuration essentially the same as conventional scintillation detection systems and which is manipulated by a user in the same manner as conventional systems while providing the advantage of optimization of transmission in the scintillator material and sensitivity of the sensor. As one skilled in the art will appreciate, the invention may likewise be employed novel designs of scintillation detecting equipment.

The present invention includes a method of making a scintillation based detection system. The method of making the scintillation based detection system comprises providing a scintillator material providing a sensor, providing a light transmission path between the scintillator material and the sensor, providing a plurality of upconverting nanoparticles; and placing the plurality of upconverting nanoparticles in the light transmission path. The light transmission path comprises a first scintillator surface, a light transmission path volume and a first sensor surface. The upconverting nanoparticles may be coated on one or both of the first scintillator surface and the first sensor surface and/or dispersed in the light transmission path volume.

In one embodiment the scintillator material and/or sensor can be manufactured using conventional manufacturing methods and then coated with the nanoparticles after fabrication. The nanoparticles may be deposited on the scintillator material and/or sensor via solvent deposition or alternatively via a polymer coating, for example. In an exemplary polymer coating, the polymer coating base material of the coating may be provided as a monomer composition and the plurality of upconverting nanoparticles provided dispersed in a solvent. The monomer composition and the upconverting nanoparticles in the solvent are combined and the upconverting nanoparticles distributed in the monomer composition. The combined monomer composition with dispersed upconverting nanoparticles is polymerized with the upconverting nanoparticles embedded in the polymer coating.

Optionally, the upconverting nanoparticles may be dispersed or embedded in one or more components of the scintillator material and/or sensor prior to manufacture of the scintillator material and/or sensor.

Optionally, the light transmission path volume may comprise a light guide. In one embodiment at least a portion of the upconverting nanoparticles may be included in the light guide. The upconverting nanoparticles may be coating or alternative embedded in the light guide.

Optionally, in some embodiments the transmission path volume may comprise a gas, aerosol, transparent adhesives, gels, and/or grease with at least a portion of the upconverting nanoparticles dispersed in the gas, aerosol, transparent adhesives, gels, and/or grease.

What is at present considered the preferred embodiment and alternative embodiments of the present invention has been shown and described herein. It will be obvious to those skilled in the art that various changes and modifications may be made therein without departing from the scope of the invention as defined by the appended claims.

What is claimed is:

1. A scintillation detection system, the system comprising:
   a scintillator material;
   a sensor;
   a light transmission path between the scintillator material and the sensor, the light transmission path comprising a first scintillator surface, a light transmission path volume and a first sensor surface; and
   a plurality of upconverting nanoparticles, the plurality of upconverting nanoparticles positioned in the light transmission path.

2. The scintillation detection system of claim 1, wherein the plurality of upconverting nanoparticles absorb light at a first energy and a first wavelength and emit light at a second energy and a second wavelength wherein the second energy is higher than the first energy and the second wavelength is shorter than the first wavelength.

3. The scintillation detection system of claim 1, wherein the first scintillator surface is adjacent the light transmission path volume and is adjacent the scintillator material and wherein at least a portion of the plurality of upconverting nanoparticles are coated on the first scintillator surface.

4. The scintillation detection system of claim 1, wherein the first sensor surface is adjacent the light transmission path volume and is adjacent the sensor and wherein at least a portion of the plurality of upconverting nanoparticles are coated on the first sensor surface.

5. The scintillation detector system of claim 1, wherein the light transmission path volume comprises a light guide.

6. The scintillation detector system of claim 5, wherein the light guide includes at least a portion of the plurality of the upconverting nanoparticles.

7. The scintillation detection system of claim 1, wherein the scintillator material is selected from the group consisting of organic crystals, organic liquids, plastic scintillators, inorganic crystals, gaseous scintillators, glasses and combinations thereof.

8. The scintillation detection system of claim 7, wherein the scintillator material is a plastic scintillator comprising a polymer matrix and a fluorescent material.

9. The scintillation detection system of claim 8, wherein the polymer matrix is selected from polyvinyltoluene, styrene polymers, polymethylmethacrylate, polyvinyl xylene, polyvinyl diphenyl, naphathalene polymers, copolymers, and mixtures thereof.

10. The scintillation detection system of claim 8, wherein the fluorescent material is selected from the group consisting of polyphenyl hydrocarbons, oxazle, oxadiazole aryls, and combinations thereof.

11. The scintillation detection system of claim 7, wherein the scintillator material is an inorganic crystal selected from the group consisting of barium fluoride, cerium fluoride, calcium fluoride, bismuth germinate, cadmium tungstate, calcium tungstate, cesium iodide, lanthium bromide, lanthium chloride, lead tungstate, lutetium iodide, lutetium oxyorthosilicate, sodium iodide, yttrium aluminum garnet, zinc sulfide, zinc tungstate, cerium fluoride and combinations thereof.

12. The scintillation detection system of claim 1 wherein the sensor is selected from the group consisting of photomultiplier tubes, silicon photomultiplier, microchannel plate, photo diodes, avalanche photodiodes and combinations thereof.

13. A method of making a scintillation detection system comprising:
   providing a scintillator material;
   providing a sensor;
   providing a light transmission path between the scintillator and the sensor, the light transmission path comprising a first scintillator surface, a light transmission path volume and a first sensor surface;
   providing a plurality of upconverting nanoparticles; and placing the plurality of upconverting nanoparticles in the light transmission path.

14. The method of claim 13 wherein at least a portion of the plurality of upconverting nanoparticles are coated on the first scintillator surface.

15. The method of claim 13 wherein at least a portion of the plurality of upconverting nanoparticles are coated on the first sensor surface.

16. The method of claim 13 wherein at least a portion of the plurality of upconverting nanoparticles are incorporated into the scintillator material during scintillator manufacturing.

17. The method of claim 13 wherein the light transmission path volume comprises a light guide.

18. The method of claim 16 wherein the light guide Includes at least a portion of the plurality of the upconverting nanoparticles.

19. The method of claim 13 wherein the scintillator material is selected from the group consisting of organic crystals, organic liquids, plastic scintillators, inorganic crystals, gaseous scintillators, glasses and combinations thereof.

* * * * *